United States Patent
Wegmann et al.

(10) Patent No.: US 9,655,020 B2
(45) Date of Patent: May 16, 2017

(54) MOBILITY ROBUSTNESS OPTIMIZATION WITH AN EXTENDED KEY PERFORMANCE INDICATOR MESSAGE

(75) Inventors: Bernhard Wegmann, Holzkirchen (DE); Ingo Viering, Munich (DE); Ahmad Awada, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 41 days.

(21) Appl. No.: 14/237,952

(22) PCT Filed: Aug. 9, 2011

(86) PCT No.: PCT/EP2011/063682
§ 371 (c)(1),
(2), (4) Date: Feb. 10, 2014

(87) PCT Pub. No.: WO2013/020584
PCT Pub. Date: Feb. 14, 2013

(65) Prior Publication Data
US 2014/0200004 A1     Jul. 17, 2014

(51) Int. Cl.
*H04W 36/00*     (2009.01)
*H04W 36/16*     (2009.01)
(Continued)

(52) U.S. Cl.
CPC ......... *H04W 36/165* (2013.01); *H04W 24/10* (2013.01); *H04W 36/245* (2013.01)

(58) Field of Classification Search
CPC .................................................... H04W 36/30
See application file for complete search history.

(56) References Cited

U.S. PATENT DOCUMENTS

2011/0263244 A1* 10/2011 Kobayashi et al. .......... 455/423
2014/0024374 A1*  1/2014 Bergman et al. ............. 455/436

FOREIGN PATENT DOCUMENTS

EP       2 219 402 A2    8/2010
WO   WO 2010/121418 A1  10/2010

OTHER PUBLICATIONS

Ahmad Awada, et al.; "Towards Self-Organizing Mobility Robustness Optimization in Inter-RAT Scenario"; May 15, 2011; Proc. Of 2011 Spring Vehicular Technology Conference, (5 pages).

(Continued)

*Primary Examiner* — Justin Lee
(74) *Attorney, Agent, or Firm* — Harrington & Smith

(57) ABSTRACT

A method includes (a) detecting based on reporting information from UEs, HO problems which have occurred within a predefined time interval, (b) classifying the detected HO problems into three categories, (c) determining information being related to at least one of the detected HO problems, wherein the information represents a refinement of one or more of the three categories or wherein the information represents a further category, (d) counting a the numbers of HO problems which have been classified into the various categories, (e) reporting a key performance indicator message indicative for the numbers of the various categories and for the determined information, and (f) adapting, based on the reported key performance indicator message, the value a mobility related network configuration parameter of the mobile radio communication network such that the mobility robustness of the communication network is optimized.

20 Claims, 3 Drawing Sheets

(51) Int. Cl.
*H04W 24/10* (2009.01)
*H04W 36/24* (2009.01)

(56) References Cited

OTHER PUBLICATIONS

3GPP TS 36.331 V10.2.0 (Jun. 2011); 3rd Generation Partnership Project; Technical Specification Group Radio Access Network; Evolved Universal Terrestrial Radio Access (E-UTRA); Radio Resource Control (RRC); Protocol specification (Release 10), (294).

3GPP TS 36.423 V10.2.0 (Jun. 2011); 3rd Generation Partnership Project; Technical Specification Group Radio Access Network; Evolved Universal Terrestrial Radio Access Network (E-UTRAN); X2 application protocol (X2AP) (Release 10), (130 pages).

3GPP TR 36.902, V9.3.1 (Mar. 2011), "3$^{rd}$ Generation Partnership Project; Technical Specification Group Radio Access Network; Evolved Universal Terrestrial Radio Access Network (E-UTRAN); Self-configuring and self-optimizing network (SON) use cases and solution (Release 9)", 21 pgs.

3GPP TS 32.425, V9.7.0 (Jun. 2011), "3$^{rd}$ Generation Partnership Project; Technical Specification Group Services and System Aspects; Telecommunication management; Performance Management (PM); Performance measurements; Evolved Universal Terrestrial Radio Access Network (E-UTRAN); (Release 9)", 50 pgs.

* cited by examiner

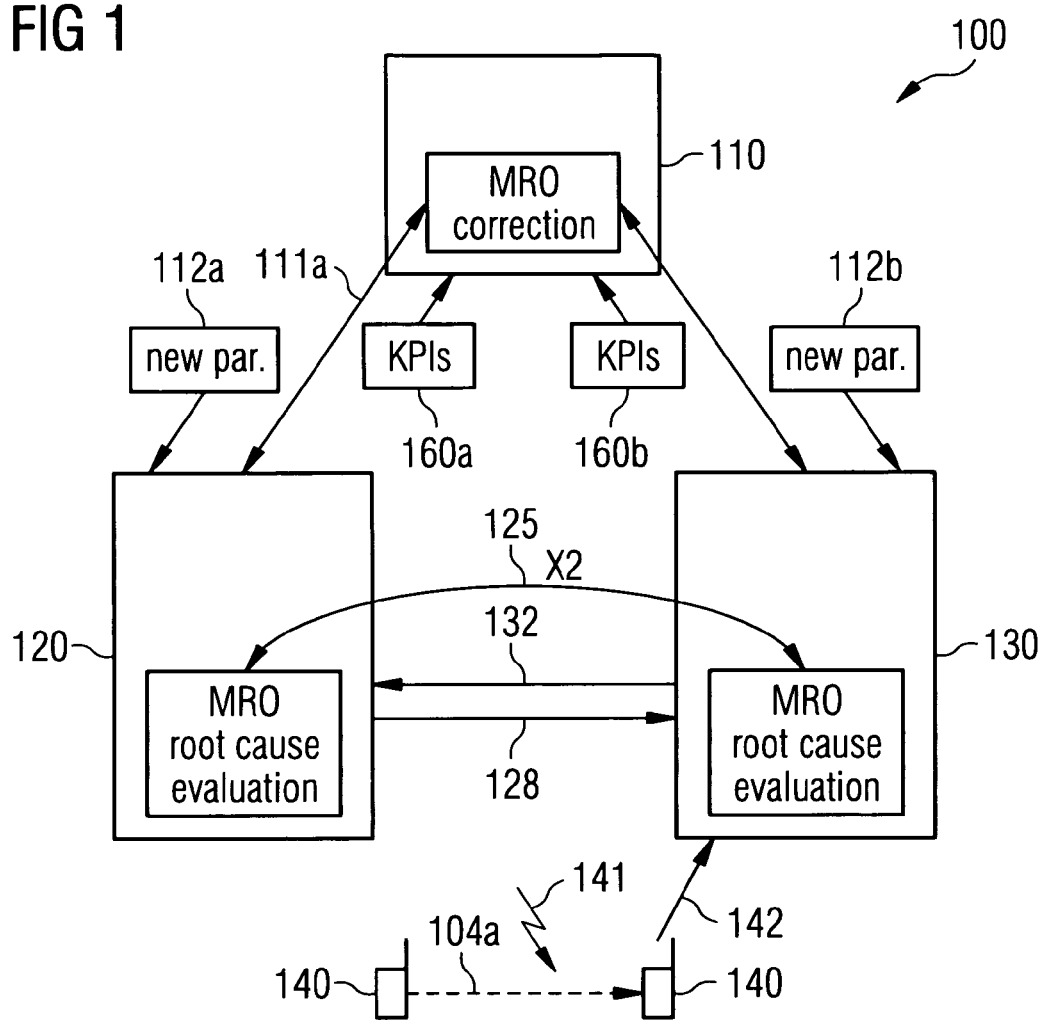

FIG 2A

| KPIs | A5 (RT) | A5 (nRT) |
|---|---|---|
| HO TL: T1 | N11 | N12 |
| HO TL: T2 | N21 | N22 |
| HO TE | N31 | N32 |
| HO to WC | N41 | N42 |
| PP | N51 | N52 |

| KPIs | A5 | TS |
|---|---|---|
| HO TL: T1 | N11 | N12 |
| HO TL: T2 | N21 | N22 |
| HO TE | N31 | N32 |
| HO to WC | N41 | N42 |
| PP | N51 | N52 |

| KPIs | A3 (loc.1) | A3 (loc.2) |
|---|---|---|
| HO TL | N11 | N12 |
| HO TE | N31 | N32 |
| HO to WC | N41 | N42 |
| PP | N51 | N52 |

206c

MOBILITY ROBUSTNESS OPTIMIZATION WITH AN EXTENDED KEY PERFORMANCE INDICATOR MESSAGE

FIELD OF INVENTION

The present invention relates to the field of mobile radio communication networks with the focus on but not limiting to the Long Term Evolution mobile standard and with the focus on inter-Radio Access Technology (RAT) handovers and intra-RAT handovers. In particular, the present invention relates to a method for optimizing the mobility robustness of a mobile radio communication network with respect to moving user equipments being supposed to be handed over within the mobile radio communication network from a source cell to a target cell. Further, the present invention relates to a base station and to a central unit, which, in conjunction which each other, are configured for carrying out the described mobility robustness optimization method.

ART BACKGROUND

One important area in the technical field of mobile radio communications relates to the handover of User Equipment (UE) from a serving cell to a (neighboring) target cell and the optimization of parameters controlling the handover. In this technical field Self Optimizing Networks (SON) and in particular the failure type and key performance indicator (KPI) specification needed for Mobility Robustness Optimization (MRO) are main targets. A more detailed failure type specification is for instance required for dual threshold measurement events consisting of two dedicated thresholds which have to be fulfilled simultaneously. Such a dual threshold is for instance used for inter-RAT mobility (event B2 in LTE or 3A in UMTS), i.e. handover between different RATs. In this technical field also intra-RAT mobility triggered by dual threshold measurement events (e.g. A5 in LTE) are of interest.

The target of MRO is to optimize those network configuration parameters (e.g. handover (HO) trigger parameters, HO thresholds or timers) such that the number of Radio Link Failures (RLFs) due to problematic HOs is reduced. A HO is triggered by measurement events reported by a UE, wherein the measurement events in turn are triggered by neighbor and serving cell measurements. In case of a simple relative comparison of a signal from a serving Base Station (BS) with a signal from a neighboring potential target BS only a single offset parameter has to be specified for the HO trigger. In case of two different RATs (and sometimes also for two different frequencies in the same RAT) absolute signal values of source and target cells have to be considered, i.e. two thresholds have to be fulfilled simultaneously for triggering a HO event.

Traditionally, the optimization of network configuration parameters in 2G or 3G mobile radio communication networks is based on labor- and cost-intensive drive testing. For a first roll-out, network-wide default configuration parameters are used and if performance management (PM) counters are accumulating RLFs or even call drops in certain service areas, several optimization loops with drive testing equipment are started in order to adapt parameters in a cell-specific manner.

The high costs and the huge effort are the reason for operator's demand for SON mechanisms where cell-specific parameters are autonomously optimized.

As has already been mentioned above there are HOs which are triggered by a measurement event comprising two individual measurements each being related to one of two thresholds, one belonging or being associated to the serving cell of RAT A and the other one belonging to the neighboring or overlaying cell of RAT B. In case of LTE, there is, for instance, the inter-RAT trigger event B2 that is used to determine the point in time of a HO and that is defined as follows:

(1) Serving cell becomes worse than threshold 1 (B2-1) AND
(2) Inter-RAT neighbor cell becomes better than threshold 2 (B2-2)

The corresponding inter-RAT measurement event on UMTS side, which triggers an inter-RAT HO, is called 3A.

Apart from the possibility that a HO is carried out with a wrong target cell HO problems often result from a bad timing, i.e. the HOs are either initiated too early or too late. For an inter-RAT HO two thresholds have to be simultaneously fulfilled. In case of LTE the above mentioned threshold 1 (B2-1) is compared against the signal strength/quality of the own serving cell (Ms) and the above mentioned threshold 2 is compared against the signal strength/quality of a neighboring cell of different RAT (Mn) and the handover is triggered if $$Ms < B2\text{-}1 \qquad (1)$$

AND $$Mn > B2\text{-}2. \qquad (2)$$

This means that a HO is triggered if the signal strength of the serving communication link (Ms) becomes worse than a threshold related to the serving signal and at the same time the signal strength of a neighboring communication link (Mn) becomes better than a second threshold related to the neighbor signal, i.e. both criteria are fulfilled. The neighboring communication link may be a communication link connecting or belonging to a neighboring cell in the same cellular network and/or a communication link to a mobile radio communication network which relates to another mobile standard.

HO problems which might even cause RLFs may occur in case the thresholds used have an inappropriate value. 3GPP has specified three different categories of HO failure types afflicted by a RLF:
(a) Failures due to too late HO triggering
(b) Failures due to too early HO triggering
(c) Failures due to HO to a wrong cell For instance in case of LTE inter-RAT mobility the reason for a too late HO (category (a)) can either be a too low threshold B2-1 or a too high threshold B2-2.

There may be a need for improving the mobility robustness of a mobile radio communication network with respect to moving user equipments being supposed to be handed over within the mobile radio communication network from a source cell to a target cell.

SUMMARY OF THE INVENTION

This need may be met by the subject matter according to the independent claims. Advantageous embodiments of the present invention are described by the dependent claims.

According to a first aspect of the invention there is provided a method for optimizing the mobility robustness of a mobile radio communication network with respect to moving user equipments being supposed to be handed over within the mobile radio communication network from a source cell to a target cell. The provided method comprises (a) detecting, by a base station based on reporting information from the user equipments, handover problems which have been occurred within a predefined time interval, (b) classifying the detected handover problems into a first category, into a second category and into a third category, (c) determining at least one information being related to at least one of the detected handover problems, wherein the at least one information represents a refinement of at least one of the three categories or wherein the at least one information represents a further category, (d) counting a first number of handover problems which have been classified into the first category, a second number of handover problems which have been classified into the second category and a third number of handover problems which have been classified into the third category, (e) reporting a key performance indicator message to a central unit of the mobile radio communication network, wherein the key performance indicator message is indicative for the first number, the second number and the third number and for the determined at least one information, and (f) adapting, based on the reported key performance indicator message, the value of at least one mobility related network configuration parameter of the mobile radio communication network such that the mobility robustness of the mobile radio communication network is optimized. Thereby, the reported key performance indicator message may be based on a statistic evaluation of a plurality of key performance indicators which have been observed within the predefined time interval representing a certain observation time.

The described method is based on the idea that by a more detailed or an additional categorization of the Mobility Robustness Optimization (MRO) Key Performance Indicators (KPI) the value of at least one network configuration parameter can be updated in such a manner that increased mobility robustness can be realized. This means that for future Handovers (HOs) of User Equipments (UEs) within the mobile radio communication network the number of HO problems or the probability for the occurrence of a HO problem caused by the mobility of the UEs can be significantly reduced.

It is mentioned that when the "at least one information" represents a refinement of one of the three categories the respective number may be split into two sub-numbers, wherein the sum of the two sub-numbers is equal to the respective number. In this respect it is pointed out that in principle also a refinement into more than two sub-categories may be possible.

It is further mentioned that when the "at least one information" represents a further category the "at least one information" may also be indicative for the number of HO problems which are assigned to the further category.

In this document the term "handover problem" may relate (a) to any event which occurs or (b) any procedure which has to be carried out only if a HO has not been completed in a usual and optimal way. Further, the term "handover problem" may also relate to a scenario, wherein in an erroneous manner a HO has not been initiated or wherein an HO has been initiated too late such that the UE suffers from a RFF and appears again later within the mobile radio communication network (i.e. it would have been faultless if the HO would have been initiated earlier).

Specifically, a HO problem might cause or may be related to a Radio Link Failure (RLF) which because of a non successful re-establishment of a radio connection for the respective UE leads to a complete call drop. Further, in this context a HO problem has also occurred if after a RLF a successful establishment of a radio connection for the particular UE has been completed. Furthermore, also unnecessary HOs (e.g. so called ping pong HOs), which do not cause a RLF but which increase in an unnecessary manner the amount of control data being used for the respective UE, are considered as HO problems.

The central unit may be any entity, which is connected inter alia to the base station (BS) and which is capable of providing the BS with network configuration parameters having an impact on the operation of the BS. The central unit may be realized by at least one data processing machine and/or by at least one virtual computing machine which may also be realized by appropriate software. Specifically, the central unit can be an Operating And Maintenance (OAM) Center, a Domain Manager (DM) and/or a Network Manager (NM). In LTE the central unit may be connected to the BS in particular by the so called Northbound Interface (Itf-N) specified in 3GPP. Thereby, the connection between the central unit and the respective BS may be an indirect connection via a so called element manager of the respective BS.

According to an embodiment of the invention (a) the first category is associated with handover problems caused by a handover trigger, which has occurred too late, (b) the second category is associated with handover problems caused by a handover trigger, which has occurred too early, and/or (c) the third category is associated with handover problems caused by handover into a wrong target cell. This may provide the advantage that the described method can be easily implemented into standards which are currently used for radio mobile communication networks. In particular, the described method can be implemented into the standard 3GPP TR 36.902 ("Evolved Universal Terrestrial Radio Access Network (E-UTRAN); Self-configuring and self-optimizing network use cases and solutions") for Long Term Evolution (LTE) mobile radio communication networks.

Descriptive speaking, in the described mobility robustness optimization method the handover failures types (key performance indicator) related with MRO are extended in such a manner that the current defined MRO classes "too early", "too late" and "to wrong cell" may be further extended either (a) by introducing at least one new category of problematic or failed HOs or (b) by adding additional information to the measurement reporting and describing the problematic or failed HOs of one of the above described three categories.

According to a further embodiment of the invention (a) at least some of the handover problems occur with handovers which have been triggered by a two condition based measurement event, wherein a first result of a first individual measurement event is compared with a first threshold and a second result of a second individual measurement event is compared with a second threshold, and (b) the at least one information being related to at least one of the detected handover problems is indicative for one of the two thresholds, which one has to be changed in order to at least reduce the respective handover problem.

This may mean that in addition to the currently used key performance indicator message, which comprises only the numbers of the "too late" HOs, the number of the "too early" HOs and the number of the HOs into a wrong target cell, the extended key performance indicator message being used in accordance with the MRO method described in this document further comprises an information element which is indicative which one of the two thresholds is the problematic one, i.e. which one of the two thresholds has to be changed in order to reduce or to get rid of at least some of the HO problems in the future.

Generally speaking, with the more precise or the extended key performance indicator message the number of HO problems being related to a two condition based measurement event is subdivided into two numbers. A first number specifies the number of HO problems, which are caused by a wrong or at least not optimal value for the first threshold. Correspondingly, a second number specifies the number of HO problems, which are caused by a wrong or at least not optimal value for the second threshold.

It is mentioned that in case of HO trigger events with one single condition like for instance the signal strength offset measurement of the known A3 event (what is typically used for intra-LTE mobility) the currently standardized KPI information may be sufficient. However, the (resolution of) currently standardized KPI information is definitely not sufficient for inter-RAT mobility where measurement events with two conditions are used. The extended key performance indicator message described in this document overcomes the missing level detail of the currently specified KPIs, which does not allow a distinction in terms single- or two-threshold condition, of the HO trigger type, and even of the handover cause (more details are given hereinafter).

According to a further embodiment of the invention at least some of the handover problems occur with a too late handover or a too early handover of a user equipment from a source cell being assigned to a first radio access technology to a target cell being assigned to a second radio access technology, wherein the second radio access technology is different from the first radio access technology. This may provide the advantage that the extended key performance indicator message described in this document comprises further detailed information about the reasons for HO problems, which frequently occur in reality. A more detailed knowledge of the reason for the HO problems may be used by the central unit in order to provide the BS and/or at least one further BS with improved parameter values, in particular improved parameter values for HO thresholds, which in the future will significantly reduce the number of HO problems.

Descriptive speaking, in case of a too late or to early inter-RAT MRO, the HO problem counter values which are reported to the central unit are further sub-divided according to the type of threshold which is considered to be responsible for the HO problem.

For instance in case of a too late inter-RAT HO which has been initiated because of deteriorating radio conditions the corresponding (counter) entries in the extended key performance indicator message may be denominated (a) "HO.R.InterRATOutFail.TooLate.B21" for the number of problems being caused by a problematic first threshold B2-1 and (b) "HO.R.InterRATOutFail.TooLate.B22" for the number of problems being caused by a problematic second threshold B2-2.

Generally speaking, the extended key performance indicator message described in this document specifies both inter-RAT MRO KPIs and inter-node messaging between different RATs. By specifying not only the information of a "failure due to too late inter-RAT HO triggering" alone but also the respective failure cause more precisely, an improved MRO algorithm can be executed in the central unit in order to optimize the inter-RAT mobility of UEs.

According to a further embodiment of the invention at least some of the handover problems occur with a too late handover or a too early handover of a user equipment from a source cell operating with a first frequency to a target cell operating with a second frequency to, wherein the second frequency is different from the first frequency and wherein both cells are assigned to the same radio access technology. This means that also for too late or to early MRO being associated with intra-RAT but inter-frequency HOs, the HO problem counter values which are reported to the central unit are further sub-divided according to the type of threshold which is considered to be responsible for the HO problem. Also this more detailed knowledge of the reason for the intra-RAT but inter-frequency HO problems may be used by the central unit in order to provide the BS and/or at least one further BS with improved HO threshold values, which in the future will reduce the number of intra-RAT but inter frequency HO problems.

For instance in case of a too late intra-RAT (intra-LTE) but inter-frequency HO the corresponding (counter) entries in the extended key performance indicator message may be denominated (a) "HO.R.InterFrequOutFail.TooLate.A5" for the number of problems being caused by a problematic first threshold A5-1 and (b) "HO.R.InterFrequOutFail.TooLate.A52" for the number of problems being caused by a problematic second threshold A5-2.

At this point it is explicitly mentioned that the described mobility robustness optimization method is also applicable for the most common intra-frequency and intra-RAT HOs.

According to a further embodiment of the invention the at least one information being related to at least one of the detected handover problems is indicative for a handover cause for triggering the handover which has caused a handover problem. Also this may provide the advantage that the central unit will be provided with more detailed information regarding the occurred HO problems.

According to a further embodiment of the invention the handover cause is (a) a handover triggering due to radio conditions, (b) a handover triggering due to a steering of radio data traffic, and/or (c) a handover triggering due to a balancing of a radio data load between the source cell and the target cell. This may provide the advantage that when receiving the (extended) key performance indicator message from the BS the central unit will be provided with more detailed information. In this respect it is mentioned that the given list of HO causes is not exclusive and that also other HO causes can be included in the (extended) KPI message.

In this respect a HO triggering because of Radio Conditions (R) may be given if (in particular due to a mobility of the UE) the quality of the radio connection link between a UE and its source BS has become worse than a radio connection link between the UE and its target BS.

A handover triggering because of a radio data traffic steering (TS) may be given if for any reason one wants to shift the radio data traffic being associated with the UE from the source cell to the target cell. This can be the case for instance if the target cell allows for a higher radio data rate than the source cell and the higher radio data rate is requested by the UE because of a certain application running on the UE which application needs the higher data rate.

A handover triggering because of a radio data load balancing (LB) may be given if, although the radio connection link between the UE and the target cell may be worse than the radio connection link between the UE and the source cell, due to a comparatively large overall data traffic within the source cell and a comparatively small overall data traffic within the target cell it may be advantageous to hand over the UE to the target cell in order to improve the overall radio performance within both cells.

According to a further embodiment of the invention the at least one information being related to at least one of the detected handover problems is indicative for the type of the measurement event which is triggering the handover which has caused a handover problem.

In case of an intra-LTE HO the triggering measurement event may be for instance an A3 measurement event or an A5 measurement event. In this respect and in accordance with current 3GPP specification an A3 measurement event comprises only one measurement value representing a signal strength offset between the radio link from the UE to the target cell and the radio link from the UE to the source cell. By contrast thereto an A5 measurement event comprises two measurement values which are compared with two different threshold values, wherein respectively one measurement value is assigned to one threshold value.

In case of an inter-RAT HO the triggering measurement event may be for instance a LTE B2 measurement event or an UMTS 3A measurement event, which, as has already been elucidated above, also represent so called dual threshold measurement events or two condition based measurement events.

According to a further embodiment of the invention the at least one information being related to at least one of the detected handover problems is indicative for a handover problem which does not lead to a radio link failure. This may provide the advantage that the central unit will also be provided which information about less serious HO problems (non RLF-related mobility problems), which however have a negative impact on the performance of the mobile radio communication network. Thereby, the information about the less serious HO problems may be treated with a separate counter within the (extended) key performance indicator message.

According to a further embodiment of the invention the handover problem which does not lead to a radio link failure is a ping-pong handover. This may provide the advantage that a very common HO problem will be reported to the central unit which, based on this information, can further improve the parameters which have an influence on the handover behavior within the mobile radio communication network.

In this respect it is mentioned that ping-pong HO is a very common phenomenon which is responsible for degrading the performance of a mobile radio communication network. A ping-pong handover is a frequently HO to and from two cells of a cell pair. The ping-pong effect may occur due to a frequent movement of the UE between the respective cell pair and/or due to comparatively high signal fluctuation at a common boundary of the cell pair. Since the ping-pong HO increases the times of handover and thus the loading of the network, it is important for network operators to reduce this undesirable effect. According to the MRO method described here this is achieved by the central unit which is provided with the necessary information in order to effectively reduce the unwanted ping-pong HOs.

According to a further embodiment of the invention the at least one information being related to at least one of the detected handover problems is indicative for the radio service type and/or the quality of service being in use when the handover problem occurs. This may provide the advantage that the central unit will be provided with additional information which may help to adapt the mobility related network configuration parameter of the mobile radio communication network in a more precise manner.

According to a further embodiment of the invention the method further comprises reporting from a further base station a further key performance indicator message to the central unit. Thereby, adapting the value of at least one mobility related network configuration parameter of the mobile radio communication network is carried out further based on the further key performance indicator message. This may provide the advantage that for optimizing parameters which have an influence on the HO behavior within the mobile radio communication network further information provided the further base station can be taken into account. This may allow for a more precise optimization of these parameters.

In LTE the BS and the further BS may be directly connected via a so call X2-interface. Therefore, it is also possible that the key performance indicator message also includes information which has been exchanged before via X2 between the further BS and the BS. Correspondingly, also for the further key performance indicator message information which has been exchanged via X2 between the BS and the further BS may be taken into account.

According to a further embodiment of the invention the method further comprises (a) detecting, by the further base station based on reporting information from the user equipments, further handover problems which have been occurred within a further predefined time interval, (b) classifying the detected further handover problems into the first category, into the second category and into the third category, (c) determining at least one further information being related to at least one of the detected further handover problems, wherein the at least one further information represents a refinement of at least one of the three categories or wherein the at least one information represents a further category, (d) counting a further first number of further handover problems which have been classified into the first category, a further second number of further handover problems which have been classified into the second category and a further third number of further handover problems which have been classified into the third category. Thereby, the further key performance indicator message is indicative for the further first number, the further second number and the further third number and for the determined at least one further information.

This may provide the advantage that also the further BS is capable of providing the central unit with extended information about HO problems, which extended information is included in the further key performance indicator message. This will allow for determining further improved parameter values, in particular further improved values for HO thresholds, to the BS and/or to the further BS, such that in the future the number of HO problems will be significantly reduced.

It is mentioned that the further HO problems may be different from, may be partially different from or may be the same as the HO problems. Accordingly, the further predefined time interval may be different from, may partially overlap with or may be the same as the predefined time interval.

According to a further aspect of the invention there is provided a base station for a mobile radio communication network for optimizing the mobility robustness of the mobile radio communication network with respect to moving user equipments being supposed to be handed over within the mobile radio communication network from a source cell to a target cell. The provided base station comprises a data processing unit (a) for detecting, based on reporting information from the user equipments, handover problems which have been occurred within a predefined time interval, (b) for classifying the detected handover problems into a first category, into a second category and into a third category, (c) for determining at least one information being related to at least one of the detected handover problems, wherein the at least one information represents a refinement of at least one of the three categories or wherein the at least one information represents a further category, and (d) for counting a first number of handover problems which have been classified into the first category, a second number of handover problems which have been classified into the second category and a third number of handover problems which have been classified into the third category. The provided base station further comprises a reporting unit for reporting a key performance indicator message to a central unit of the mobile radio communication network, wherein the key performance indicator message is indicative for the first number, the second number and the third number and for the determined at least one information, and wherein the key performance indicator message is configured such that the central unit is capable of adapting, based on the reported key performance indicator message, the value of at least one mobility related network configuration parameter of the mobile radio communication network such that the mobility robustness of the mobile radio communication network is optimized.

According to a further aspect of the invention there is provided a central unit for a mobile radio communication network for optimizing the mobility robustness of the mobile radio communication network with respect to moving user equipments being supposed to be handed over within the mobile radio communication network from a source cell to a target cell. The provided central unit comprises a receiving unit for receiving from a base station a key performance indicator message being indicative (a) for a first number of first handover problems of a first category, which have been occurred within a predefined time interval and which have been reported from at least one user equipment, (b) for a second number of second handover problems of a second category, which have been occurred within the predefined time interval and which have been reported from at least one user equipment, (c) for a third number of third handover problems of a third category, which have been occurred within the predefined time interval and which have been reported from at least one user equipment and (d) for at least one information being related to at least one of the detected handover problems, wherein the at least one information represents a refinement of at least one of the three categories or wherein the at least one information represents a further category. The provided central unit further comprises an adapting unit for adapting, based on the received key performance indicator message, the value of at least one mobility related network configuration parameter of the mobile radio communication network such that the mobility robustness of the mobile radio communication network is optimized.

According to a further aspect of the invention there is provided a computer program for optimizing the mobility robustness of a mobile radio communication network with respect to moving user equipments being supposed to be handed over within the mobile radio communication network from a source cell to a target cell. The computer program, when being executed by a data processor, is adapted for controlling and/or for carrying out the mobility robustness optimization method as described above.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIG. 1 shows a mobile radio communication network comprising a base station and a central unit, wherein the base station is configured to forward an extended key performance indicator message to the central unit which based on the information provided with the extended key performance indicator message calculates new network configuration parameters such that the number of Radio Link Failures due to problematic Handovers is reduced.

FIGS. 2*a*, 2*b* and 2*c* show examples for the information which may be included in the extended key performance indicator message.

DETAILED DESCRIPTION

Figure 3:
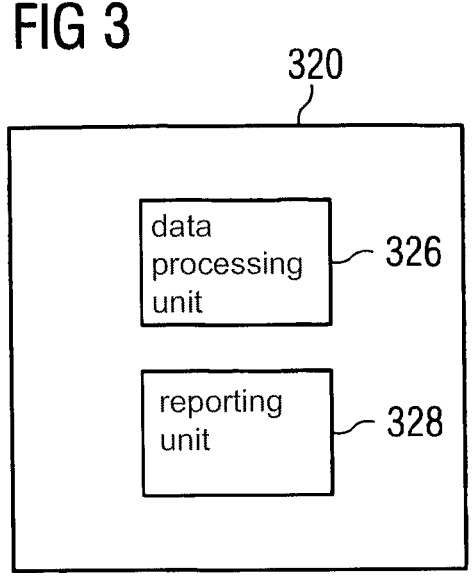
FIG. 3 shows a base station for a mobile radio communication network for optimizing the mobility robustness of the mobile radio communication network.

The illustration in the drawing is schematically. It is noted that in different figures, similar or identical elements are provided with reference signs which are different from the corresponding reference signs only within the first digit.

FIG. 1 shows in accordance with the invention described in this document a mobile radio communication network 100 which comprises a central unit 110, a base station (BS) 120 and a further base station 130. According to the embodiment described here the network 100 is a LTE network, the central unit 110 is an Operation And Maintenance (OAM) Center or a Domain Manager (DM) and the two base stations are eNodeBs.

In accordance with current 3GG standards the two eNodeBs 120 and 130 are connected with each other via an X2-interface 125. The eNodeB 120 is indirectly connected in a known manner (via respectively an element manager of the eNodeB 120) with the OAM Center 110 via a so called Northbound interface 111a. Correspondingly, the eNodeB 130 is indirectly connected in a known manner (via respectively an element manager of the eNodeB 120) with the OAM Center 110 via a Northbound interface 111b.

As can be seen from FIG. 1, the mobile radio communication network comprises further a user equipment (UE) 140, which initially is served by the eNodeB 120 being assigned to a (source) cell of the mobile radio communication network 100.

The UE 140 may be any type of communication end device, which is capable of connecting with an arbitrary communication network access point (e.g. the eNodeBs 120, 130) of the mobile radio communication network 100. In particular the UE 140 may be a cellular mobile phone, a Personal Digital Assistant (PDA), a notebook computer and/or any other movable communication device.

The arrow 140a in FIG. 1 indicates the movement of the UE 140, which is accomplished from the (source) cell being assigned to the eNodeB 120 towards a target cell being assigned to the eNodeB 130. According to the mobile radio scenario depicted in FIG. 1, a too early Handover (HO) from the source cell to the target cell is performed. As a consequence, shortly after the HO a Radio Link Failure (RLF) occurs, which in FIG. 1 is indicated by a flash 141. After the RLF 141 the UE 140 continues to move and after a certain distance has been covered, a successful re-establishment of the radio connection between the UE 140 and the eNodeB 130 is achieved. This means that the UE 140 does not suffer from a complete call drop.

After having successfully been connected to the eNodeB 130 (i.e. the target eNodeB), the UE 140 sends a RLF report 142 to the eNodeB 130. In response to the reception of the RLF report 142 the eNodeB 130 sends a RLF indication message 132 to the eNodeB 120 (i.e. the source eNodeB) blaming the eNodeB 120 that it has carried out a problematic HO. In response to the reception of the RLF indication message 132 the eNodeB 130 sends a HO report 128 to the eNodeB 130. Based on the received exchanged information each of the two eNodeBs 120 and 130 performs a Mobility Robustness Optimization (MRO) cause evaluation for the occurred HO failure.

It is mentioned that in accordance with 3GPP features for root cause evaluation distributed solutions are employed. In any case, a MRO which is realized by corrections of network configuration parameters such as e.g. HO trigger parameters, HO thresholds and/or timers will typically not be done based on individual events, but on statistics. Therefore, every cell will count the identified HO problems caused by itself over a certain period of time. The corresponding counter numbers which are called key performance indicators (KPIs) are typically generated separately for every cell.

In the centralized solution described here the cells/eNodeBs report those KPIs to the OAM center 110. According to the embodiment described here the KPIs are reported by means of a Key Performance Indicator (KPI) message. As can be seen from FIG. 1, a KPI message 160a is reported from the (source) eNodeB 120 to the OAM center 110 and a KPI message 160b is reported from the (target) eNodeB 130 to the OAM center 110.

Based on the information provided via the KPI messages 160a and 160b the OAM center 110 decides about appropriate changes of those network configuration parameters (e.g. HO trigger parameters, HO thresholds and/or timers) such that the number of future RLFs due to problematic HOs is reduced. The advantage of the described centralized solution compared to a decentralized solution is that the OAM center 110 can also consider KPIs from other cells. Therefore, the OAM center 110 is able to make a more global and more reliable decision.

After having adapted or changed network configuration parameters the OAM center 110 forwards these new parameters to the respective eNodeB. As can be seen from FIG. 1, a corresponding new parameter message 112a is transmitted from the OAM center 110 to the (source) eNodeB 120 and a corresponding new parameter message 112b is transmitted from the OAM center 110 to the (target) eNodeB 130.

FIGS. 2a, 2b and 2c show examples for additional information which may be included in the (extended) Key Performance Indicator (KPI) message. FIG. 2a shows a first KPI message 260a, FIG. 2b shows a second KPI message 260b and FIG. 2c shows a third KPI message 260c.

In a logical representation the information being included in the KPI messages 260a, 260b and 260c can be best depicted in a matrix type table. However, it is pointed out that the matrix type illustration is just used for the purpose of an easier understanding. The information can be included in the extended key performance indicator messages 260a, 260b and 260c in any other arbitrary manner.

In FIGS. 2a, 2b and 2c table entries which are written in normal letters are already known from the current 3GPP specification. Table entries which are written in italic bold are associated with the extended KPI information, which according to the MRO method described in this document are forwarded as additional information from the respective eNodeB to the OAM center.

The entries Nxx in the cells of each exemplary extended key performance indicator message 260a, 260b and 260c are counted numbers which correspond to the respective HO problem. Specifically, the sum of the numbers which are given in one (horizontal) row corresponds to the total number of HO problems, which in a predefined time interval have been occurred and which are of the corresponding category depicted in the first column.

For example, in the (extended) KPI messages 260a and 260b the sum of N1x (=N11+N12) is the total number of HO problems, which are caused by a too late HO because of a wrong threshold T1. The sum of N2x is the total number of HO problems, which are caused by a too late HO because of a wrong threshold T2. Further, the sum of N3x is the total number of HO problems which are caused by a too early HO. Further, the sum of N4x is the total number of HO problems which are caused by a HO to a wrong cell. Last but not least the sum of N5x is the total number of HO problems which are caused by ping-pong HO.

As can be seen from the FIG. 2c illustrating the third (extended) KPI message 260c the sum of N1x (=N11+N12) is the total number of HO problems, which are caused by a too late HO. In this respect it is mentioned that in accordance with current 3GPP specification an A3 measurement event comprises only one measurement value representing a signal strength offset between the strengths of two radio links. Therefore, there are not used two different thresholds and a distinction for a too late HO with respect to different thresholds makes no sense. In accordance with the KPI messages 260a and 260b the sum of N3x is the total number of HO problems which are caused by a too early HO, the sum of N4x is the total number of HO problems which are caused by a HO to a wrong cell. Last but not least the sum of N5x is the total number of HO problems which are caused by ping-pong HO.

With regard to the columns in the extended key performance indicator message 260a (a) the numbers Nx1 (x=1, 2, 3, 4, 5) are assigned to measurement events A5 for real time (RT) users and (b) the numbers Nx2 are assigned to measurement events A5 for non real time (nRT) users.

With regard to the columns in the extended key performance indicator message 260b (a) the numbers Nx1 (x=1, 2, 3, 4, 5) are assigned to measurement events A5 (no distinction between RT users and nRT users is made here and (b) the numbers Nx2 (x=1, 2, 3, 4, 5) are assigned to HO problems wherein the HO was not triggered because of changing radio condition but because of a radio data traffic steering.

With regard to the columns in the extended key performance indicator message 260c (a) the numbers Ny1 (y=1, 3, 4, 5) are assigned to HO problems which are given by a HO which has been triggered by an A3 measurement event if the respective UEs reside in a location area 1 and (b) the numbers Ny2 are assigned to HO problems which are given by a HO which has been triggered by an A3 measurement event if the respective UEs reside in a location area 2. Thereby, the different location areas may be assigned e.g. to two different streets each having a certain direction.

Based on the described extended and compared to known key performance indicator messages much more detailed information about the HO problems the OAM center will be able to adapt the configuration parameters (e.g. HO trigger parameters, HO thresholds and/or timers) for the mobile radio communication network in a much more precise and reliable manner. As a consequence, the number of HO problems which can be expected in the future can be significantly reduced.

It is mentioned that the described (extended) KPI messages are just examples and also other types of (extended) KPI messages are possible, which may have the same or a different number of (vertical) columns and/or which may have the same or a different number of (horizontal) rows. Further, the HO problems which have been occurred within a predetermined time period may be differentiated with a higher number of attributes for problematic HOs. Furthermore, also a different number and/or different types of categories may be defined in order to differentiate finer between different types of HO problems.

FIG. 3 shows a base station respectively an eNodeB 320 for a mobile radio communication network for optimizing the mobility robustness of the mobile radio communication network. The base station 320 comprises data processing unit 326 and a reporting unit 328. In accordance with the invention described in this document the data processing unit 326 is configured
(a) for detecting, based on reporting information from the user equipments 140, handover problems which have been occurred within a predefined time interval, (b) for classifying the detected handover problems into a first category, into a second category and into a third category, (c) for determining at least one information being related to at least one of the detected handover problems, wherein the at least one information represents a refinement of at least one of the three categories or wherein the at least one information represents a further category, and (d) for counting a first number of handover problems which have been classified into the first category, a second number of handover problems which have been classified into the second category and a third number of handover problems which have been classified into the third category.

The reporting unit 328 is configured for reporting a key performance indicator message to a central unit of the mobile radio communication network, wherein the key performance indicator message is indicative for the first number, the second number and the third number and for the determined at least one information. Thereby, the key performance indicator message is configured such that the central unit is capable of adapting, based on the reported key performance indicator message, the value of at least one mobility related network configuration parameter of the mobile radio communication network such that the mobility robustness of the mobile radio communication network is optimized.

It is mentioned that the data processing unit 326 can be realized with one or more computing units. Further, the described functions of the data processing unit 326 can be realized by hardware, by software or by a combination of hardware and software.

Figure 4:
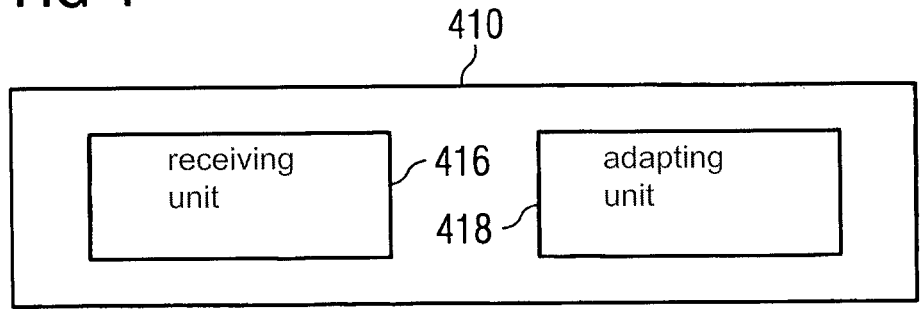
FIG. 4 shows a central unit for a mobile radio communication network for optimizing the mobility robustness of the mobile radio communication network.

FIG. 4 shows a central unit 410 for a mobile radio communication network for optimizing the mobility robustness of the mobile radio communication network. The central unit 410, which may be realized e.g. by an OAM center, comprises a receiving unit 416 and an adapting unit 418.

The receiving unit 416 is configured for receiving from a base station a key performance indicator message being indicative (a) for a first number of first handover problems of a first category, which have been occurred within a predefined time interval and which have been reported from at least one user equipment 140, (b) for a second number of second handover problems of a second category, which have been occurred within the predefined time interval and which have been reported from at least one user equipment 140, (c) for a third number of third handover problems of a third category, which have been occurred within the predefined time interval and which have been reported from at least one user equipment 140 and (d) for at least one information being related to at least one of the detected handover problems, wherein the at least one information represents a refinement of at least one of the three categories or wherein the at least one information represents a further category.

The adapting unit 418 is configured for adapting, based on the received key performance indicator message, the value of at least one mobility related network configuration parameter of the mobile radio communication network such that the mobility robustness of the mobile radio communication network is optimized.

It is mentioned that the receiving unit 416 can be realized with one or more computing units. Further, the described functions of the receiving unit 416 can be realized by hardware, by software or by a combination of hardware and software.

It is noted that it may also be possible in further refinements of the invention to combine features from different illustrative embodiments described herein. It should also be noted that reference signs in the claims should not be construed as limiting the scope of the claims.

LIST OF REFERENCE SIGNS 100 mobile radio communication network
110 central unit/Operation And Maintenance (OAM) Center
111a Northbound interface
111b Northbound interface
112a new parameter message 112*b* new parameter message
120 base station/eNodeB
128 Handover (HO) report
125 X2-interface
130 base station/eNodeB
132 Radio Link Failure (RLF) indication
140 user equipment (UE)
140*a* movement of UE
141 Radio Link Failure (RLF)
142 RLF report
160*a* Key Performance Indicator (KPI) message
160*b* Key Performance Indicator (KPI) message
260*a* Key Performance Indicator (KPI) message
260*b* Key Performance Indicator (KPI) message
260*c* Key Performance Indicator (KPI) message
320 base station/eNodeB
326 data processing unit
328 reporting unit
410 central unit/Operation And Maintenance Center
416 receiving unit
418 adapting unit

The invention claimed is:

1. A method for optimizing a mobility robustness of a mobile radio communication network with respect to moving user equipments being supposed to be handed over within the mobile radio communication network from a source cell to a target cell, the method comprising
detecting, by a base station based on reporting information from the user equipments, handover problems which have been occurred within a predefined time interval,
classifying the detected handover problems into a first category, into a second category and into a third category,
determining at least one information being related to at least one of the detected handover problems, wherein the at least one information represents a refinement of at least one of the three categories or wherein the at least one information represents a further category,
counting a first number of handover problems which have been classified into the first category, a second number of handover problems which have been classified into the second category and a third number of handover problems which have been classified into the third category,
reporting a key performance indicator message to a central unit of the mobile radio communication network, wherein the key performance indicator message is indicative for the first number, the second number and the third number and for the determined at least one information, and
adapting, based on the reported key performance indicator message, a value of at least one mobility related network configuration parameter of the mobile radio communication network such that the mobility robustness of the mobile radio communication network is optimized.

2. The method as set forth in claim 1, wherein
the first category is associated with handover problems caused by a handover trigger, which has occurred too late,
the second category is associated with handover problems caused by a handover trigger, which has occurred too early, and/or
the third category is associated with handover problems caused by handover into a wrong target cell.

3. The method as set forth in claim 1, wherein
at least some of the handover problems occur with handovers which have been triggered by a two condition based measurement event, wherein a first result of a first individual measurement event is compared with a first threshold and a second result of a second individual measurement event is compared with a second threshold, and
the at least one information being related to at least one of the detected handover problems is indicative for one of the two thresholds, which one has to be changed in order to at least reduce the respective handover problem.

4. The method as set forth in claim 3, wherein at least some of the handover problems occur with a too late handover or a too early handover of a user equipment from a source cell being assigned to a first radio access technology to a target cell being assigned to a second radio access technology, wherein the second radio access technology is different from the first radio access technology.

5. The method as set forth in claim 3, wherein at least some of the handover problems occur with a too late handover or a too early handover of a user equipment from a source cell operating with a first frequency to a target cell operating with a second frequency to, wherein the second frequency is different from the first frequency and wherein both cells are assigned to the same radio access technology.

6. The method as set forth in claim 1, wherein the at least one information being related to at least one of the detected handover problems is indicative for a handover cause for triggering the handover which has caused a handover problem.

7. The method as set forth in claim 6, wherein the handover cause is
(a) a handover triggering due to radio conditions,
(b) a handover triggering due to a steering of radio data traffic, and/or
(c) a handover triggering due to a balancing of a radio data load between the source cell and the target cell.

8. The method as set forth in claim 1, wherein the at least one information being related to at least one of the detected handover problems is indicative for the type of the measurement event which is triggering the handover which has caused a handover problem.

9. The method as set forth in claim 1, wherein the at least one information being related to at least one of the detected handover problems is indicative for a handover problem which does not lead to a radio link failure.

10. The method as set forth in claim 9, wherein the handover problem which does not lead to a radio link failure is a ping-pong handover.

11. The method as set forth in claim 1, wherein the at least one information being related to at least one of the detected handover problems is indicative for the radio service type and/or the quality of service being in use when the handover problem occurs.

12. The method as set forth in claim 1, further comprising
reporting from a further base station a further key performance indicator message to the central unit,
wherein adapting the value of at least one mobility related network configuration parameter of the mobile radio communication network is carried out further based on the further key performance indicator message.

13. The method as set forth in claim 12, further comprising
detecting, by the further base station based on reporting information from the user equipments, further handover problems which have been occurred within a further predefined time interval, classifying the detected further handover problems into the first category, into the second category and into the third category, determining at least one further information being related to at least one of the detected further handover problems, wherein the at least one further information represents a refinement of at least one of the three categories or wherein the at least one information represents a further category, counting a further first number of further handover problems which have been classified into the first category, a further second number of further handover problems which have been classified into the second category and a further third number of further handover problems which have been classified into the third category, wherein the further key performance indicator message is indicative for the further first number, the further second number and the further third number and for the determined at least one further information.

14. A base station for a mobile radio communication network for optimizing a mobility robustness of the mobile radio communication network with respect to moving user equipments being supposed to be handed over within the mobile radio communication network from a source cell to a target cell, the base station comprising a data processing unit configured to
 (a) detect, based on reporting information from the user equipments, handover problems which have been occurred within a predefined time interval,
 (b) classify the detected handover problems into a first category, into a second category and into a third category,
 (c) determine at least one information being related to at least one of the detected handover problems, wherein the at least one information represents a refinement of at least one of the three categories or wherein the at least one information represents a further category, and
 (d) count a first number of handover problems which have been classified into the first category, a second number of handover problems which have been classified into the second category and a third number of handover problems which have been classified into the third category, and a reporting unit for
 (e) report a key performance indicator message to a central unit of the mobile radio communication network, wherein the key performance indicator message is indicative for the first number, the second number and the third number and for the determined at least one information, wherein the key performance indicator message is configured such that the central unit is capable of adapting, based on the reported key performance indicator message, a value of at least one mobility related network configuration parameter of the mobile radio communication network such that the mobility robustness of the mobile radio communication network is optimized.

15. The base station as set forth in claim 14, wherein the first category is associated with handover problems caused by a handover trigger, which has occurred too late, the second category is associated with handover problems caused by a handover trigger, which has occurred too early, and/or the third category is associated with handover problems caused by handover into a wrong target cell.

16. The base station as set forth in claim 14, wherein at least some of the handover problems occur with handovers which have been triggered by a two condition based measurement event, wherein a first result of a first individual measurement event is compared with a first threshold and a second result of a second individual measurement event is compared with a second threshold, and the at least one information being related to at least one of the detected handover problems is indicative for one of the two thresholds, which one has to be changed in order to at least reduce the respective handover problem.

17. The base station as set forth in claim 14, wherein the at least one information being related to at least one of the detected handover problems is indicative for a handover cause for triggering the handover which has caused a handover problem.

18. The base station as set forth in claim 14, wherein the at least one information being related to at least one of the detected handover problems is indicative for the type of the measurement event which is triggering the handover which has caused a handover problem.

19. The base station as set forth in claim 14, wherein the at least one information being related to at least one of the detected handover problems is indicative for a handover problem which does not lead to a radio link failure.

20. The base station as set forth in claim 14, wherein the at least one information being related to at least one of the detected handover problems is indicative for the radio service type and/or the quality of service being in use when the handover problem occurs.

* * * * *

UNITED STATES PATENT AND TRADEMARK OFFICE
CERTIFICATE OF CORRECTION

| | |
|---|---|
| PATENT NO. | : 9,655,020 B2 |
| APPLICATION NO. | : 14/237952 |
| DATED | : May 16, 2017 |
| INVENTOR(S) | : Wegmann et al. |

It is certified that error appears in the above-identified patent and that said Letters Patent is hereby corrected as shown below:

In the Claims

Claim 14, Column 17, Line 46 "for" should be deleted and --configured to-- should be inserted.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*